(No Model.)
J. F. BRADBURY.
CARDING ENGINE.
No. 472,653.
Patented Apr. 12, 1892.
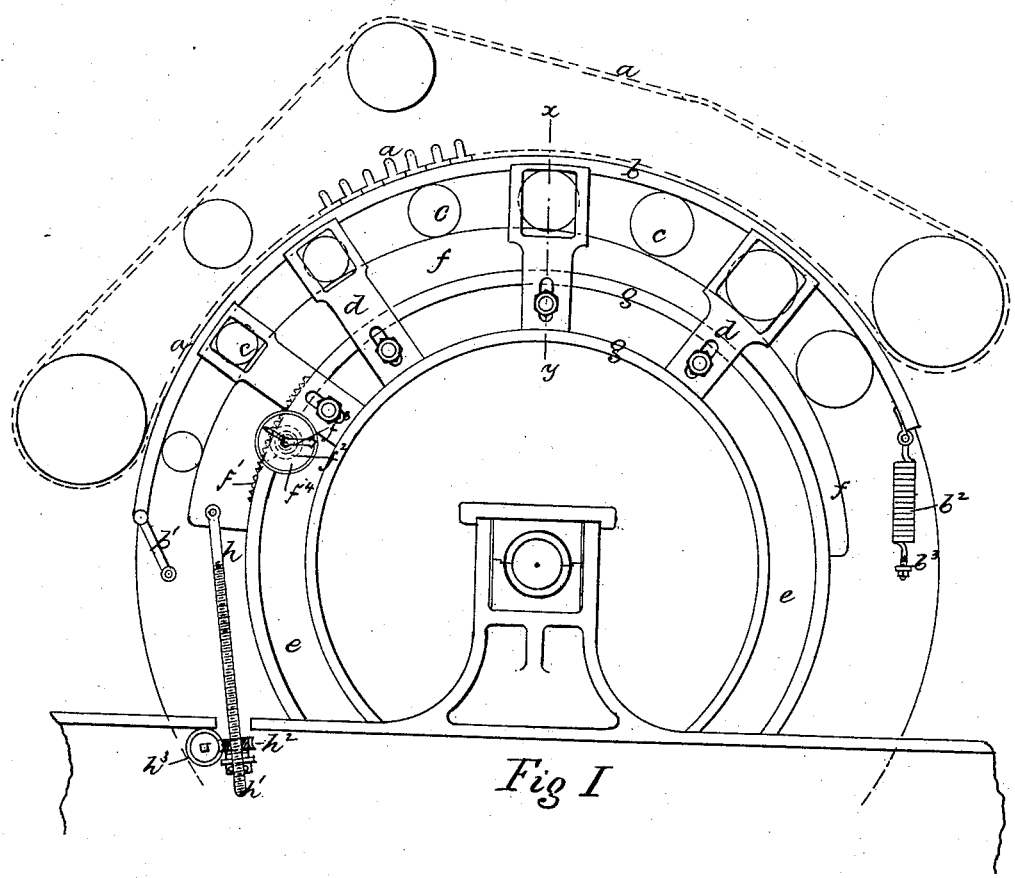
Fig I.
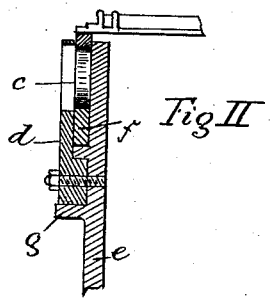
Fig II.
Witnesses
W. Harry Muzzy.
E. J. Cussen.
Inventor
John Frederick Bradbury
by W. H. Babcock
Atty.

UNITED STATES PATENT OFFICE.

JOHN FREDERICK BRADBURY, OF BOMBAY, INDIA.

CARDING-ENGINE.

SPECIFICATION forming part of Letters Patent No. 472,653, dated April 12, 1892.

Application filed October 29, 1891. Serial No. 410,268. (No model.)

*To all whom it may concern:*

Be it known that I, JOHN FREDERICK BRADBURY, a subject of the Queen of Great Britain and Ireland, and a resident of Bombay, India, have invented certain Improvements in Carding-Engines, of which the following is a specification.

My invention relates to improved means for supporting and adjusting the flats in that class of carding-engines wherein a series of traveling flats work in conjunction with a cylinder and wherein it is of great importance to be able to accurately adjust the distance of the points of the card-teeth on the flats from the points of the card-teeth on the cylinder.

In order that my invention may be more clearly understood, I will describe the same with reference to the accompanying drawings, in which—

Figure 1 represents so much of one side of a carding-engine as is necessary to explain the nature and mode of applying my invention. Fig. 2 is a transverse section through $x\ y$ of Fig. 1.

The letters of reference in both figures relate to the same parts.

For supporting the flats $a\ a$ I provide a flexible or elastic bend $b$ of what I term the "ring" type, preferably obtained by first making a ring of suitable cross-section, which, after having been accurately turned and bored, is divided and furnishes two semicircular bends. One of each of such bends, hereinafter referred to as "flexible" bends, is placed near each end of the cylinder, where they form the immediate supports for the ends of the flats.

The flexible bends are supported underneath by disks, rollers, or bowls $c\ c$, carried in slides or recesses in brackets $d\ d$ in such a manner that they may rotate therein and may approach toward or recede from the axis of the cylinder in a radial direction. The brackets $d\ d$ are secured to and are adjustable by means of slots or similar devices on the side frames $e\ e$ of the carding-engine. (Hereinafter referred to as "fixed" bends.) To the said brackets may also be fixed the grinding-steps and guide-pulleys for the revolving flats. Between the disks or bowls $c\ c$ and the fixed bend I insert a curved wedge $f$, the lower face of which is concentric with the cylinder, and is so arranged that it may be caused to travel round the corresponding upper curved face of the fixed bend, which is provided with concentric ribs or guides $g\ g$ for receiving the curved wedge $f$ and the brackets $d\ d$. The upper face of the curved wedge $f$ is so formed that when it is slid lengthwise in one direction all the bowls or disks resting thereon will be pushed away from the axis of the cylinder, while when the wedge is slid in the opposite direction the bowls or disks will be able to approach nearer to the axis of the cylinder. In order that the whole of the bowls may be raised or lowered an equal distance from the cylinder, it is desirable that the upper surface of the curved wedge should form part of a helix. The flexible bend $b$, being supported by the disk or bowls $c\ c$, will partake of their radial movement, and by varying the position of the curved wedge $f$ the distance of the flats $a\ a$ from the center of the cylinder may be regulated at will. The diameters of the bowls increase from the thick end of the wedge toward the thin end and are so proportioned that the points of contact of the peripheries of the bowls with the flexible bend $b$ are concentric with the cylinder.

Means are provided for readily sliding the wedge—as, for example, a link $h$, hinged to the end of the wedge and formed as a screw at its lower end $h'$, where it passes through a nut formed in the boss of the worm-wheel $h^2$. Into the worm-wheel $h^2$ gears a worm $h^3$, by the rotation of which the wedge can be slid backward or forward, as may be desired. For indicating the traverse of the wedge $f$ I provide a pinion $f^2$, which takes into a rack $f'$, formed in the under surface of the wedge $f$. On the axle of the pinion $f^2$ is a finger or pointer $f^3$, which indicates on the dial $f^4$ the displacement of the wedge $f$. The dial may be graduated to indicate the actual amount of the radial adjustment of the flats. The flexible bend $b$ is held in position and prevented from being displaced by a bracket $b'$ at one end and by a spring $b^2$, provided with an adjusting-screw and nut $b^3$ at the other end.

I find that when the points of support of the accessory bend are about eight inches apart a flexible bend of square section one inch thick and made of cast-iron possesses the necessary elasticity to permit the bend to accommodate itself to the varying positions of the points of support, while it is sufficiently rigid to carry the weight of the flats between the points of support without departing to an injurious extent from a circular arc concentric with the cylinder. The number and distance apart of the disks and the material of which the flexible bend consists may, however, be varied to some extent, and the arrangement and proportions above referred to are merely given by way of example.

I am aware that flexible bends and curved wedges revolving about the center of the cylinder have already been used, and I make no claim to these elements of themselves.

What I claim as my invention, and desire to secure by Letters Patent, is—

1. In a carding-engine, the combination of the curved wedge $f$, devices for actuating the same, the circular supporting-pieces $c\ c$, and the flexible bend $b$, resting thereon, substantially as and for the purpose hereinbefore described and shown.

2. In a carding-engine, the combination of the curved wedge $f$, concentric on its under surface with the cylinder, and devices for actuating said wedge, with the disks or bowls $c\ c$, resting on the upper surface thereof and having their diameters so graduated that their points of contact with a flexible bend resting thereon are concentric with the cylinder, and the elastic or flexible bend $b$, substantially as and for the purpose hereinbefore set forth and shown.

In testimony whereof I have signed my name to this specification in the presence of two subscribing witnesses.

JOHN FREDERICK BRADBURY.

Witnesses:
E. T. WHITELOW,
*Patent Agent, Manchester.*
JOHN HALL,
*Manchester.*